(12) United States Patent
Yamashita et al.

(10) Patent No.: US 12,703,311 B2
(45) Date of Patent: Aug. 11, 2026

(54) POWER SUPPLY DEVICE FOR SLIDING DOOR

(71) Applicant: YAZAKI CORPORATION, Tokyo (JP)

(72) Inventors: Hiroshi Yamashita, Makinohara (JP); Tetsuo Yamada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 203 days.

(21) Appl. No.: 18/882,700

(22) Filed: Sep. 11, 2024

(65) Prior Publication Data

US 2025/0100471 A1 Mar. 27, 2025

(30) Foreign Application Priority Data

Sep. 26, 2023 (JP) ................................ 2023-163120

(51) Int. Cl.
*B60R 16/02* (2006.01)
*B60R 16/03* (2006.01)
*H02G 11/00* (2006.01)

(52) U.S. Cl.
CPC ......... *B60R 16/0215* (2013.01); *H02G 11/00* (2013.01); *B60R 16/03* (2013.01)

(58) Field of Classification Search
CPC ...... B60R 16/0215; B60R 16/03; H02G 11/00
See application file for complete search history.

(56) References Cited

U.S. PATENT DOCUMENTS

2017/0297515 A1* 10/2017 Sekino ................. H02G 11/006
2021/0016725 A1 1/2021 Yamashita et al.

FOREIGN PATENT DOCUMENTS

JP 2016135637 A * 7/2016
JP 2020001480 A * 1/2020
JP 2021-19386 A 2/2021

* cited by examiner

*Primary Examiner* — Daniel J Colilla
(74) *Attorney, Agent, or Firm* — KENEALY VAIDYA LLP

(57) ABSTRACT

A power supply device for a sliding door includes: a wire harness that draws a straddling portion into a door trim through a lower side of a vehicle below a lower end; a vehicle-body-side protector that draws out the straddling portion toward the sliding door; and a door-side protector that is a member configured to perform routing of the straddling portion toward an introduction portion positioned in a closing operation direction when the sliding door is fully closed, and that draws, out of a cylindrical portion toward an upper side of the vehicle, a door-side end portion of the straddling portion drawn into the introduction portion.

6 Claims, 7 Drawing Sheets

POWER SUPPLY DEVICE FOR SLIDING DOOR

CROSS-REFERENCE TO RELATED APPLICATION(S)

The present application claims priority to and incorporates by reference the entire contents of Japanese Patent Application No. 2023-163120 filed in Japan on Sep. 26, 2023.

BACKGROUND OF THE INVENTION

1. Field of the Invention

The present invention relates to a power supply device for a sliding door.

2. Description of the Related Art

In the related art, in a vehicle such as an automobile, a power supply device for a sliding door which electrically connects a power source (a secondary battery or the like) on the vehicle body side to a switch, an electrical component, or the like on the sliding door side is mounted. In this power supply device for a sliding door, a wire harness fulfills a function of such electrical connection, and a straddling portion of the wire harness straddles the vehicle body and the sliding door (Japanese Patent Application Laid-open No. 2021-19386).

For example, in the power supply device for a sliding door in the related art, in a case where a fixing position of the wire harness on the sliding door side is set above a scuff plate on a side sill in a vehicle, the straddling portion is exposed in the vehicle interior when the sliding door is located at a fully closed position. Therefore, the power supply device for a sliding door in the related art is not preferable in terms of the appearance in that the straddling portion can be visually recognized from the vehicle interior when the sliding door is located at the fully closed position. Further, the power supply device for a sliding door in the related art is not preferable in terms of the durability of the wire harness in that the straddling portion is located at a position where the straddling portion can be touched by an occupant in the vehicle interior. In addition, in another power supply device for a sliding door in the related art, the straddling portion is retracted into a door trim of the sliding door, and an end portion of a front edge of the straddling portion is held by a uniaxial rotation mechanism. Then, in the power supply device for a sliding door, the rotation mechanism is operated when the sliding door is opened and closed, and a lower end of the door trim can be lowered downward in the vehicle by causing the straddling portion to follow movement of the rotation mechanism inside the door trim. However, although this power supply device for a sliding door in the related art is preferable in terms of appearance in that a space between a lower end of the door trim and the scuff plate can be narrowed, on the other hand, an operating range of the rotation mechanism inside the door trim is wide, and a space occupied by the rotation mechanism inside the door trim is large, and thus the mountability of a door installation component (an electrical component such as a speaker, a drink holder, or the like) installed on the sliding door is degraded.

SUMMARY OF THE INVENTION

In this respect, an object of the present invention is to provide a power supply device for a sliding door which improves the appearance viewed from a vehicle interior and the mountability of a door installation component.

A power supply device for a sliding door according to one aspect of the present invention includes a wire harness that has a straddling portion that straddles a vehicle body and a sliding door and draws the straddling portion into a door trim through a lower side of a vehicle below a lower end of the door trim; a vehicle-body-side protector that is fixed to the vehicle body and allows a vehicle-body-side end portion of the straddling portion to be inserted inside and the straddling portion to be drawn out toward the sliding door; a door-side protector that is a member configured to perform routing of the straddling portion drawn into the door trim toward an introduction portion positioned in a closing operation direction of the sliding door when the sliding door is fully closed, and that draws, out of a cylindrical portion toward an upper side of the vehicle, a door-side end portion of the straddling portion drawn into the introduction portion; a rotation member that has a bearing in which a cylinder axis of the cylindrical portion is set as an axis line of a first rotation axis and which rotates the door-side protector about the axis of the cylindrical portion by a force received by the door-side protector from the door-side end portion of the straddling portion depending on opening and closing of the sliding door, and a rotation shaft in which a vehicle width direction is set as an axis line of a second rotation axis; and a fixed member that is fixed to an inner panel of the sliding door and has a bearing which rotates the rotation member about the rotation shaft by a force received by the rotation member from the door-side end portion of the straddling portion via the door-side protector.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a plan view of the power supply device for a sliding door according to the embodiment from the vehicle interior, and illustrates when the sliding door is located at the fully opened position;

DETAILED DESCRIPTION OF THE PREFERRED EMBODIMENT

Hereinafter, an embodiment of a power supply device for a sliding door according to the present invention will be described in detail with reference to the drawings. Note that this invention is not limited by the embodiment.

Embodiment

One embodiment of the power supply device for a sliding door according to the present invention will be described on the basis of FIGS. 1 to 7.

Figure 1:
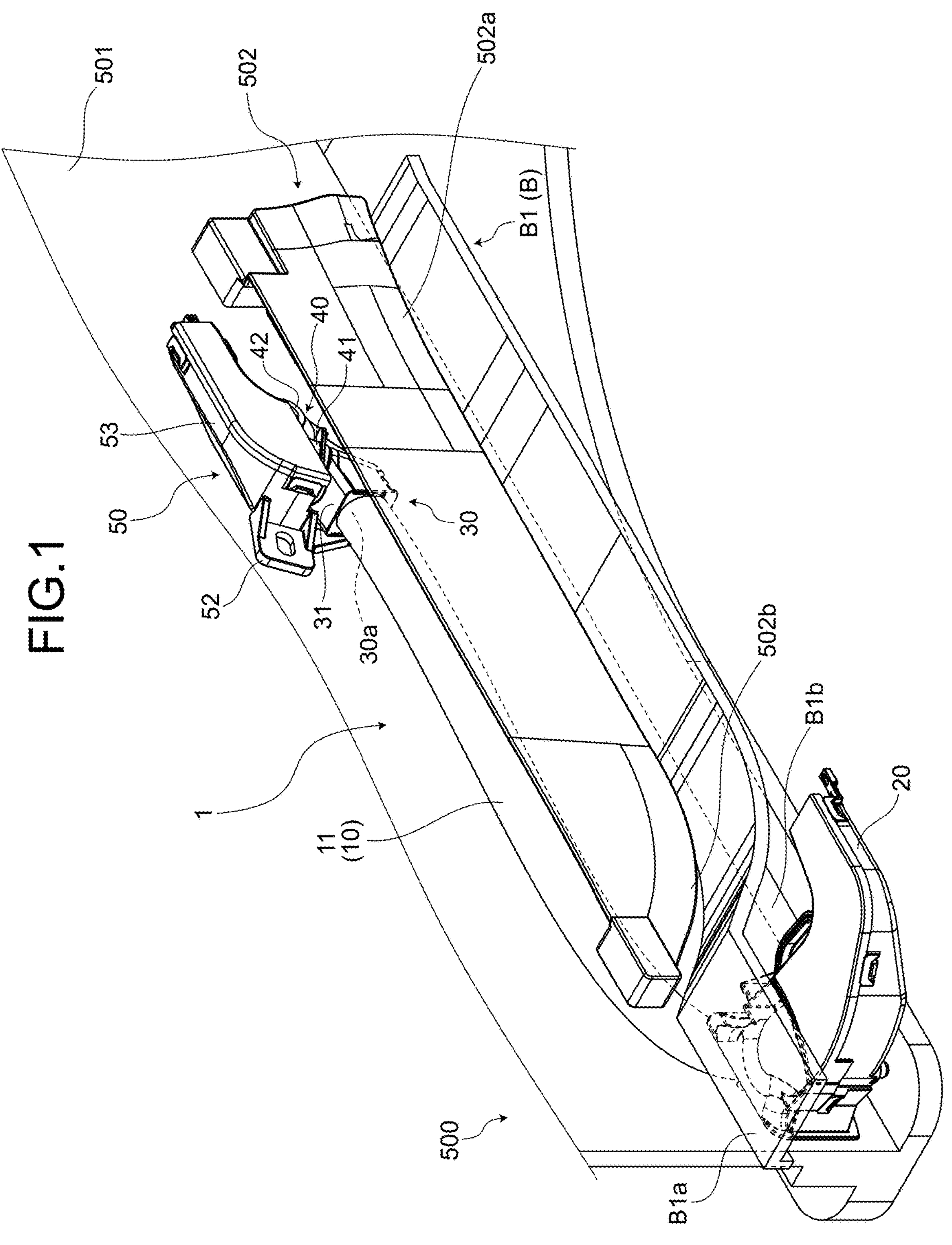
FIG. 1 is a perspective view illustrating a power supply device for a sliding door according to an embodiment, and illustrates when a sliding door is located at a fully closed position.
Figure 2:
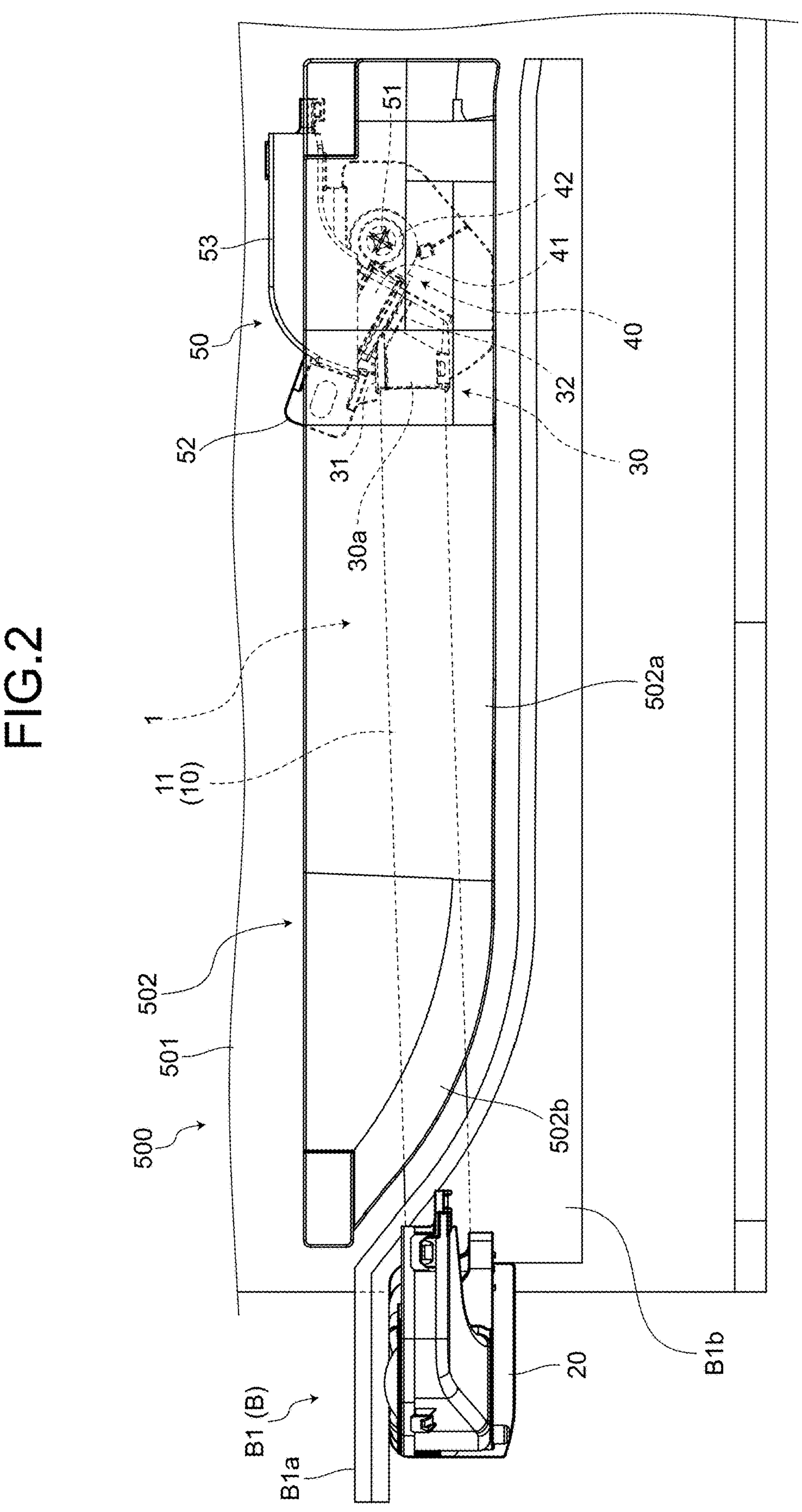
FIG. 2 is a plan view of the power supply device for a sliding door according to the embodiment from a vehicle interior, and illustrates when the sliding door is located at the fully closed position.

Reference numeral 1 in FIGS. 1 and 2 denotes the power supply device for a sliding door according to the present embodiment.

The power supply device 1 for a sliding door is mounted on a vehicle such as an automobile in which a sliding door 500 capable of reciprocating in a sliding direction with respect to a vehicle body B is installed (FIGS. 1 and 2). The sliding door 500 is installed, for example, on the side of the vehicle and reciprocates in a vehicle front-rear direction. The power supply device 1 for a sliding door fulfills a function of power supply from a power source (a secondary battery or the like) on the vehicle body B side to an electrical connection target object (not illustrated) on the sliding door 500 side, for example. The electrical connection target object is an object installed on the sliding door 500, such as an electrical component or a switch. For example, the electrical component of the sliding door 500 represents a drive device that drives a power window, a speaker, or the like. Further, the switch of the sliding door 500 represents a switch for operating a power window, a switch for operating a power seat, or the like.

The power supply device 1 for a sliding door includes a wire harness 10 (FIGS. 1 and 2). One end of the wire harness 10 is electrically connected directly or indirectly to a power source on the vehicle body B side, and the other end thereof is electrically connected directly or indirectly to the electrical connection target object on the sliding door 500 side. Hence, the wire harness 10 has a straddling portion 11 which is some portion between the one end and the other end and straddles the vehicle body B and the sliding door 500 (FIGS. 1 and 2). In other words, the one end portion of the wire harness 10 is present in front of one end of the straddling portion 11, and the other end portion thereof is present in front of the other end of the straddling portion 11. Although not illustrated, an exterior member such as a corrugated tube is provided on an outer side of the straddling portion 11.

In the wire harness 10, one end (hereinafter, referred to as a "vehicle-body-side end portion") of the straddling portion 11 is assembled on the vehicle body B side (FIGS. 1 and 2). The power supply device 1 for a sliding door includes a protector (hereinafter, referred to as a "vehicle-body-side protector") 20 that is fixed to the vehicle body B and allows a vehicle-body-side end portion of the straddling portion 11 to be inserted inside and the straddling portion 11 to be drawn out toward the sliding door 500 (FIGS. 1 and 2). The vehicle-body-side end portion of the straddling portion 11 is assembled on the vehicle body B side via the vehicle-body-side protector 20. The vehicle-body-side protector 20 is made of an insulating material such as a synthetic resin.

The vehicle-body-side protector 20 is assembled to the vehicle body B without relative displacement with respect to the vehicle body B by, for example, screwing and fixing or the like. The vehicle-body-side protector 20 illustrated herein is installed on the lower side of the vehicle below an upper wall B1*a* of a side sill B1 of the vehicle body B (FIGS. 1 and 2). Note that the side sill B1 in the drawings illustrates only a part thereof.

The vehicle-body-side protector 20 has an opening open toward the sliding door 500 in the vehicle width direction, and the straddling portion 11 is drawn out of the opening toward the sliding door 500 (FIG. 1). The straddling portion 11 drawn out of the vehicle-body-side protector 20 is drawn toward the sliding door 500 via a side wall B1*b* of the side sill B1 (FIGS. 1 and 2). For example, a notch or a through-hole through which the straddling portion 11 passes is formed in the side wall B1*b* of the side sill B1.

Figure 3:
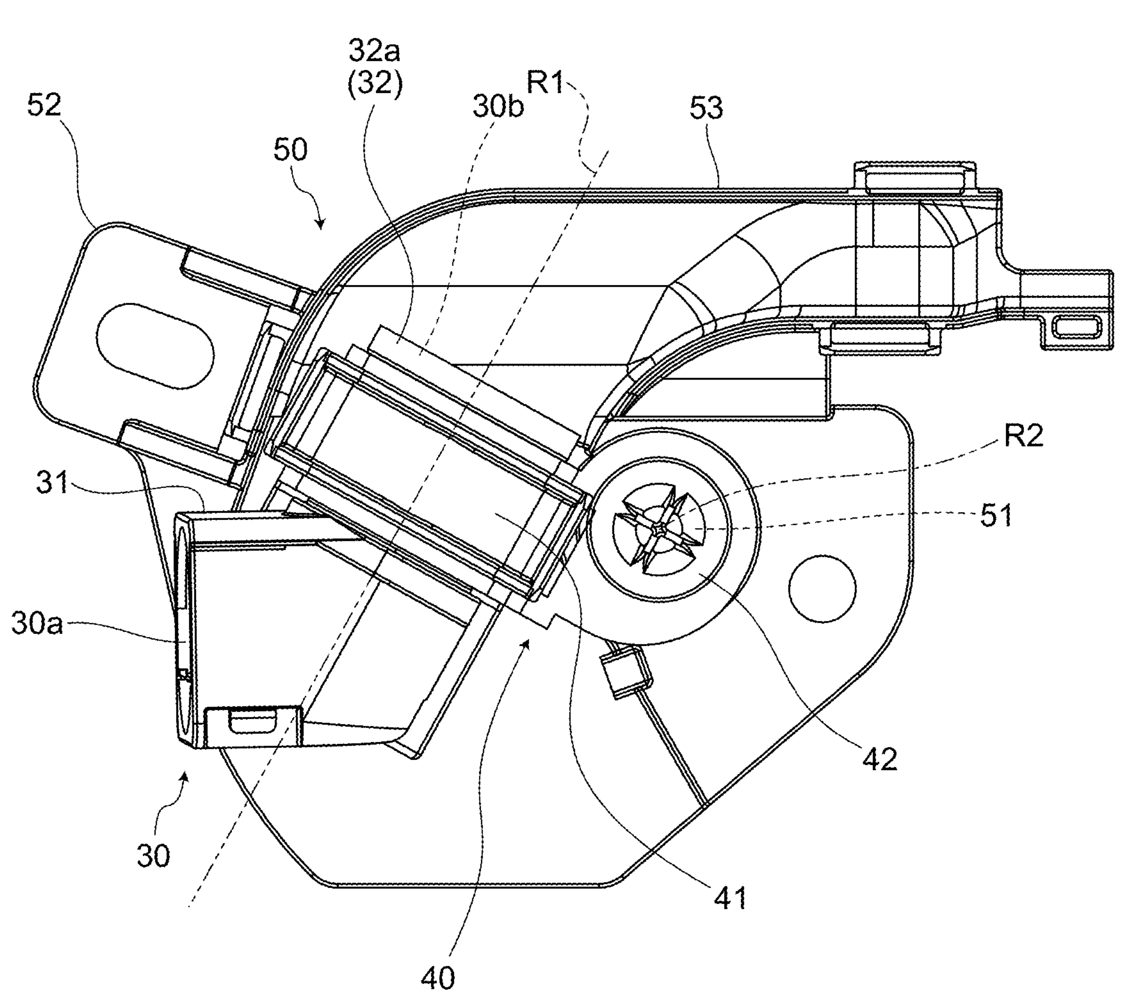
FIG. 3 is an illustrative view illustrating a rotation mechanism (a door-side protector, a rotation member, and a fixed member) of the power supply device for a sliding door according to the embodiment, and illustrates when the sliding door is located at the fully closed position.

In the wire harness 10, the other end (hereinafter, referred to as a "door-side end portion") of the straddling portion 11 is assembled on the sliding door 500 side (FIGS. 1 and 2). In the wire harness 10, the straddling portion 11 is drawn into a space between an inner panel 501 of the sliding door 500 and a door trim 502 (that is, into the door trim 502), and the door-side end portion is assembled on the inner panel 501 side. The straddling portion 11 is drawn into the door trim 502 through the lower side of the vehicle below a lower end 502*a* of the door trim 502 (FIGS. 1 and 2). The power supply device 1 for a sliding door includes a protector (hereinafter, referred to as a "door-side protector") 30 that is a member configured to perform routing of the straddling portion 11 drawn into the door trim 502 toward an introduction portion 31 positioned in a closing operation direction of the sliding door 500 when the sliding door 500 is fully closed (here, on a front side of the vehicle), and that draws, out of a cylindrical portion 32 toward an upper side of the vehicle, the door-side end portion of the straddling portion 11 drawn into the introduction portion 31 (FIGS. 1 to 3). The door-side protector 30 is made of an insulating material such as a synthetic resin. Note that only some parts of the inner panel 501 and the door trim 502 in the drawings are illustrated.

The door-side protector 30 is formed as a cylindrical protector component in which the cylindrical introduction portion 31 and the cylindrical portion 32 intersect each other (FIG. 3). The door-side protector 30 illustrated herein allows cylinder axes of the introduction portion 31 and the cylindrical portion 32 to intersect each other at an obtuse angle. When the sliding door is fully closed, the door-side protector 30 is disposed such that an opening (an opening of the introduction portion 31) 30*a* at one end points in an opening operation direction of the sliding door 500 (here, toward a rear side of the vehicle), and an opening (an opening of the cylindrical portion 32) 30*b* of the other end points toward the upper side of the vehicle (FIGS. 1 to 3). Further, when the sliding door is fully closed, when viewed from a position at which the straddling portion 11 is drawn into the door trim 502, the door-side protector 30 is disposed to be separated from the position by a space in the closing operation direction of the sliding door 500 (toward the front side of the vehicle) (FIGS. 1 and 2). Hence, when the sliding door is fully closed, the straddling portion 11 is drawn into the door trim 502 and then is routed in the closing operation direction of the sliding door 500 (toward the front side of the vehicle) (FIGS. 1 and 2). When the sliding door is fully closed, the door-side end portion of the straddling portion 11 is drawn in the closing operation direction of the sliding door 500 (toward the front side of the vehicle) from the opening 30*a* of the introduction portion 31 into the introduction portion 31, passes through the introduction portion 31 and the cylindrical portion 32, and is drawn out of the opening 30*b* of the cylindrical portion 32 toward the upper side of the vehicle. When the sliding door is fully closed, the straddling portion 11 illustrated herein is drawn into the door trim 502 through the lower side of the vehicle below a corner 502*b* (on the rear side of the vehicle) positioned in the opening operation direction of the sliding door 500 at the lower end 502*a* of the door trim 502 (FIGS. 1 and 2). Hence, the straddling portion 11 illustrated herein when the sliding door is fully closed is routed from the drawn-out location in the closing operation direction of the sliding door 500 (toward the front side of the vehicle), and then drawn into the introduction portion 31.

The power supply device 1 for a sliding door rotates the door-side protector 30 together with the door-side end portion of the straddling portion 11 with two rotation axes different in axial direction when the sliding door 500 is opened and closed. In this respect, the power supply device 1 for a sliding door includes a rotation member 40 that has a bearing 41 in which a cylinder axis of the cylindrical portion 32 is set as an axis line of a first rotation axis R1 and which rotates the door-side protector 30 about the axis of the cylindrical portion 32 by a force received by the door-side protector 30 from the door-side end portion of the straddling portion 11 depending on the opening and closing of the sliding door 500, and a rotation shaft 42 in which a vehicle width direction is set as an axis line of a second rotation axis R2 (FIGS. 1 to 3). Then, the power supply device 1 for a sliding door includes a fixed member 50 that is fixed to the inner panel 501 of the sliding door 500 and has a bearing 51 which rotates the rotation member 40 about the rotation shaft 42 by a force received by the rotation member 40 from the door-side end portion of the straddling portion 11 via the door-side protector 30 (FIGS. 1 to 3). The rotation member 40 and the fixed member 50 are made of an insulating material such as a synthetic resin.

In the rotation member 40, the bearing 41 is formed in an annular shape concentrically surrounding an outer circumferential surface of the cylindrical portion 32, and the cylindrical portion 32 disposed on an inner side of the bearing 41 is concentrically rotated about the first rotation axis R1. The bearing 41 is sandwiched between a bent portion (a boundary portion between the introduction portion 31 and the cylindrical portion 32) of the door-side protector 30 and an annular flange 32*a* provided on the opening 30*b* side of the outer circumferential surface of the cylindrical portion 32, thereby holding the cylindrical portion 32 concentrically and rotatably (FIG. 3).

In addition, in the rotation member 40, an annular or columnar rotation shaft 42 is formed in a shape projecting from the bearing 41 (FIG. 3). In the rotation member 40 illustrated herein, the rotation shaft 42 is disposed on the closing operation direction side (toward the front side of the vehicle) of the sliding door 500 from the bearing 41.

The fixed member 50 has the bearing 51 and has a fixed portion 52 fixed to the inner panel 501 (FIGS. 1 to 3). The fixed portion 52 is assembled to the inner panel 501 without relative displacement with respect to the inner panel 501 by, for example, screwing and fixing or the like. The fixed portion 52 illustrated herein is formed in a plate shape, and has a bearing 51 formed in an annular or columnar shape in a part thereof. The bearing 51 rotatably holds the rotation shaft 42 concentrically by fitting in an axial direction with respect to the rotation shaft 42.

In addition, the fixed member 50 has a protector portion 53 surrounding the door-side end portion of the straddling portion 11 drawn out of the cylindrical portion 32 (FIGS. 1 to 3). The protector portion 53 is formed in a cylindrical shape, guides the door-side end portion of the straddling portion 11 drawn out of the cylindrical portion 32 toward the upper side of the vehicle in the closing operation direction of the sliding door 500 (toward the front side of the vehicle), and draws the door-side end portion out of the opening in the closing operation direction (toward the front side of the vehicle).

The door-side end portion of the straddling portion 11 is assembled toward the vehicle body B via the biaxial rotation mechanism including the door-side protector 30, the rotation member 40, and the fixed member 50. Since the straddling portion 11 changes its shape between the vehicle-body-side protector 20 and the door-side protector 30 by opening and closing the door of the sliding door 500, a reaction force due to a shape change is applied to the vehicle-body-side protector 20 from the vehicle-body-side end portion and is applied to the door-side protector 30 from the door-side end portion.

Since the vehicle-body-side protector 20 is fixed to the vehicle body B, the force received from the vehicle-body-side end portion of the straddling portion 11 is directly returned to the vehicle-body-side end portion as a reaction force. On the other hand, when the door-side protector 30 receives the force from the door-side end portion of the straddling portion 11, the door-side protector 30 relatively rotates with respect to the fixed member 50 about the first rotation axis R1 (about the axis of the cylindrical portion 32) due to rotational torque corresponding to a component of the force, and relatively rotates with respect to the fixed member 50 about the second rotation axis R2 (about the rotation shaft 42) due to rotational torque corresponding to a component of the force.

In the power supply device 1 for a sliding door, when the sliding door 500 at the fully closed position is opened, the door-side protector 30 receives a force from the door-side end portion of the straddling portion 11, and the door-side protector 30 and the door-side end portion of the straddling portion 11 are rotated forward about the first rotation axis R1 so that the opening 30*a* of the introduction portion 31 pointing in the opening operation direction of the sliding door 500 (toward the rear side of the vehicle) points toward the vehicle interior side when the sliding door is fully closed (FIGS. 1, 2, 4, and 5). Further, in the power supply device 1 for a sliding door, when the sliding door 500 at the fully closed position is opened, the rotation member 40 receives a force from the door-side end portion of the straddling portion 11 via the door-side protector 30, and the door-side protector 30, the door-side end portion of the straddling portion 11, and the rotation member 40 are rotated about the second rotation axis R2 so that the opening 30*a* of the introduction portion 31 pointing in the opening operation direction of the sliding door 500 (toward the rear side of the vehicle) points toward the lower side of the vehicle when the sliding door is fully closed (FIGS. 1, 2, 4, and 5).

Figure 7:
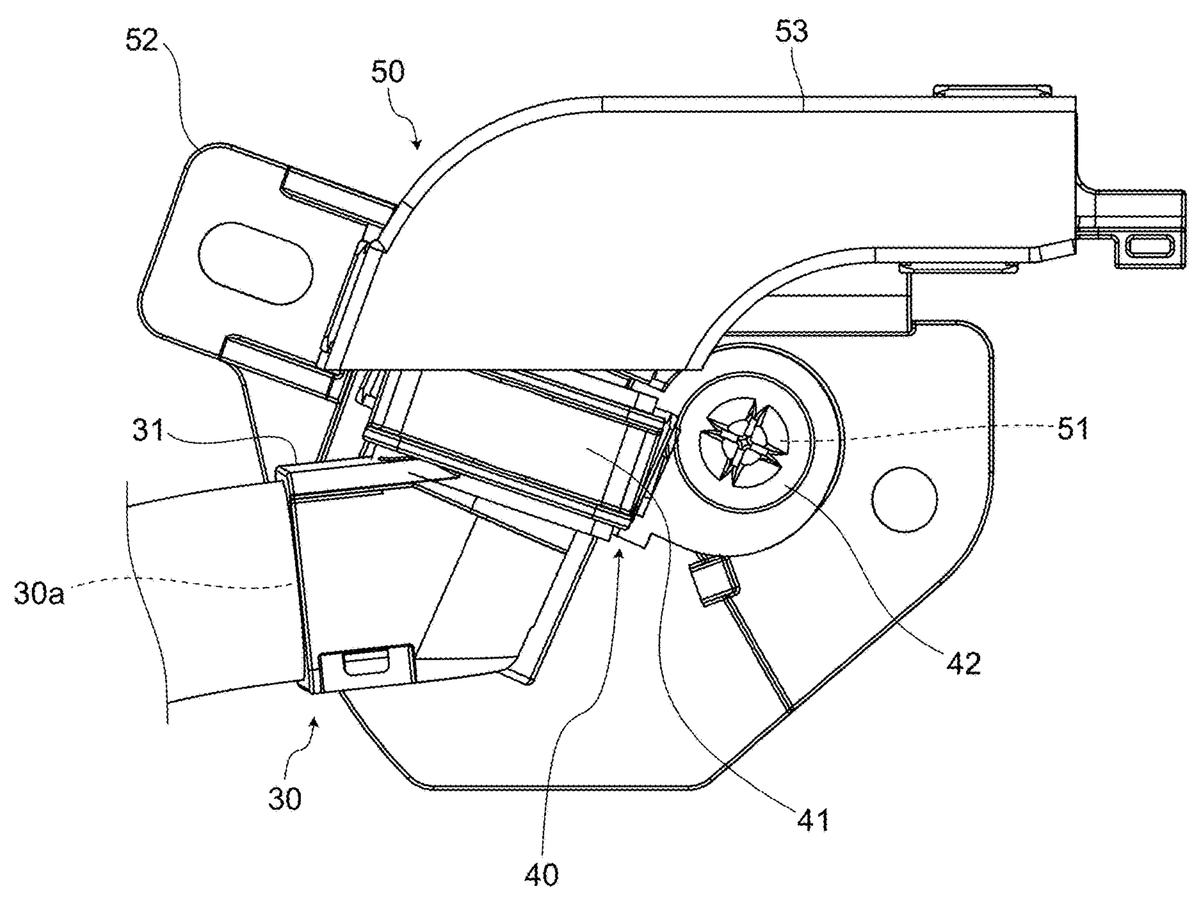
FIG. 7 is an illustrative view illustrating the rotation mechanism (the door-side protector, the rotation member, and the fixed member) of the power supply device for a sliding door according to the embodiment, and illustrates when the sliding door is located at the half-opened position.

The straddling portion 11 illustrated herein has a small force applied to the door-side protector 30 from the door-side end portion until the sliding door 500 at the fully closed position (FIGS. 1 and 2) reaches a half-opened position (FIG. 6) due to a routing path when the sliding door is fully closed. Hence, in the power supply device 1 for a sliding door illustrated herein, until the sliding door 500 at the fully closed position reaches the half-opened position, a rotation angle of the door-side protector 30 about the first rotation axis R1 and a rotation angle of the door-side protector 30 about the second rotation axis R2 decrease (FIG. 7). In addition, since the straddling portion 11 illustrated herein is lowered toward the lower side of the vehicle between the vehicle-body-side protector 20 and the door-side protector 30 when the sliding door 500 at the half-opened position moves to the fully opened position (FIG. 5) due to the routing path when the sliding door is fully closed, a large force toward the lower side of the vehicle is applied to the door-side protector 30 from the door-side end portion. Hence, in the power supply device 1 for a sliding door illustrated herein, when the sliding door 500 at the half-opened position moves to the fully opened position, a rotation angle of the door-side protector 30 about the first rotation axis R1 and a rotation angle of the door-side protector 30 about the second rotation axis R2 become larger (FIGS. 4, 5, and 7) than when the sliding door 500 at the fully closed position moves to the half-opened position.

Figure 4:
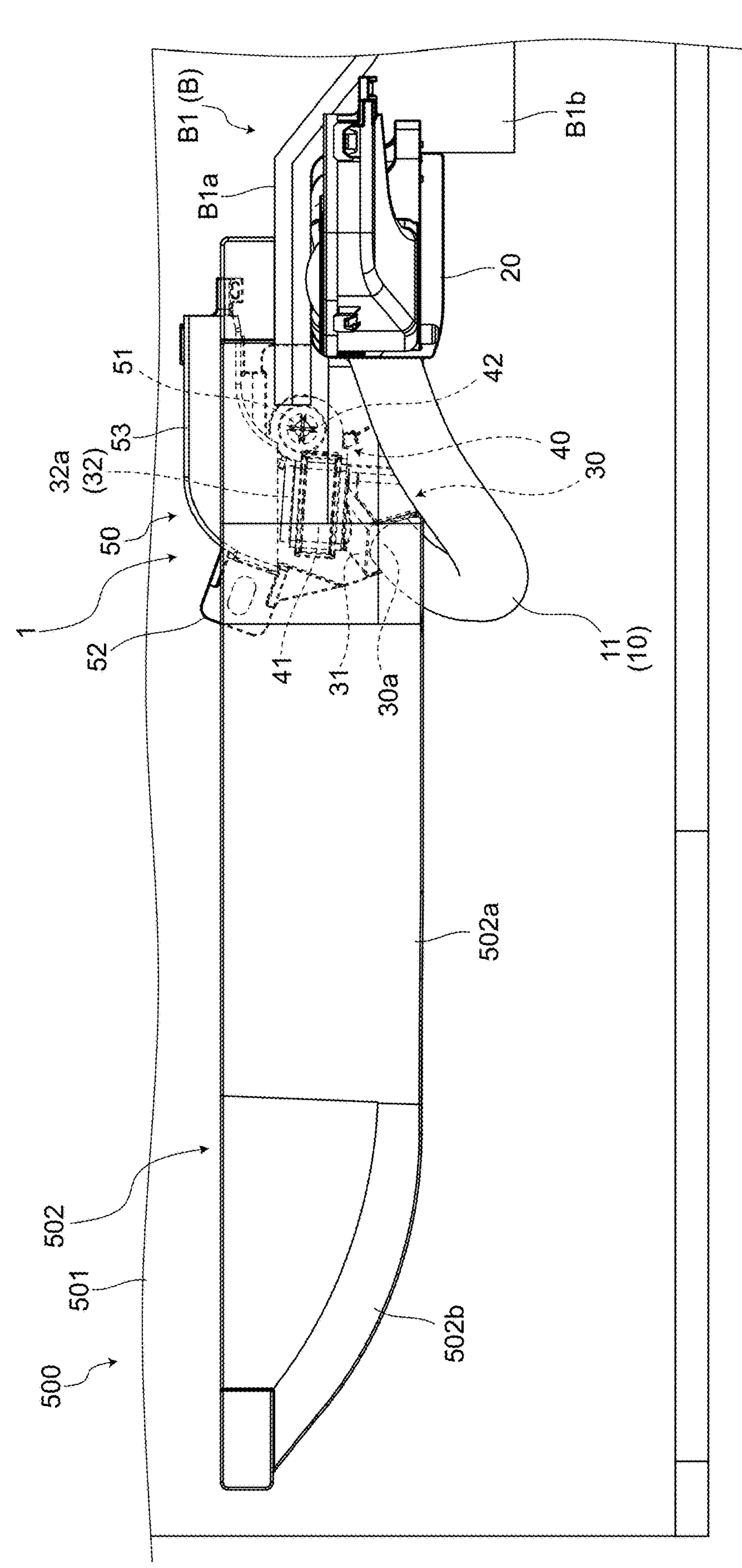
FIG. 4 is a plan view of the power supply device for a sliding door according to the embodiment from the vehicle interior, and illustrates a state before the sliding door is located at a fully opened position.
Figure 5:
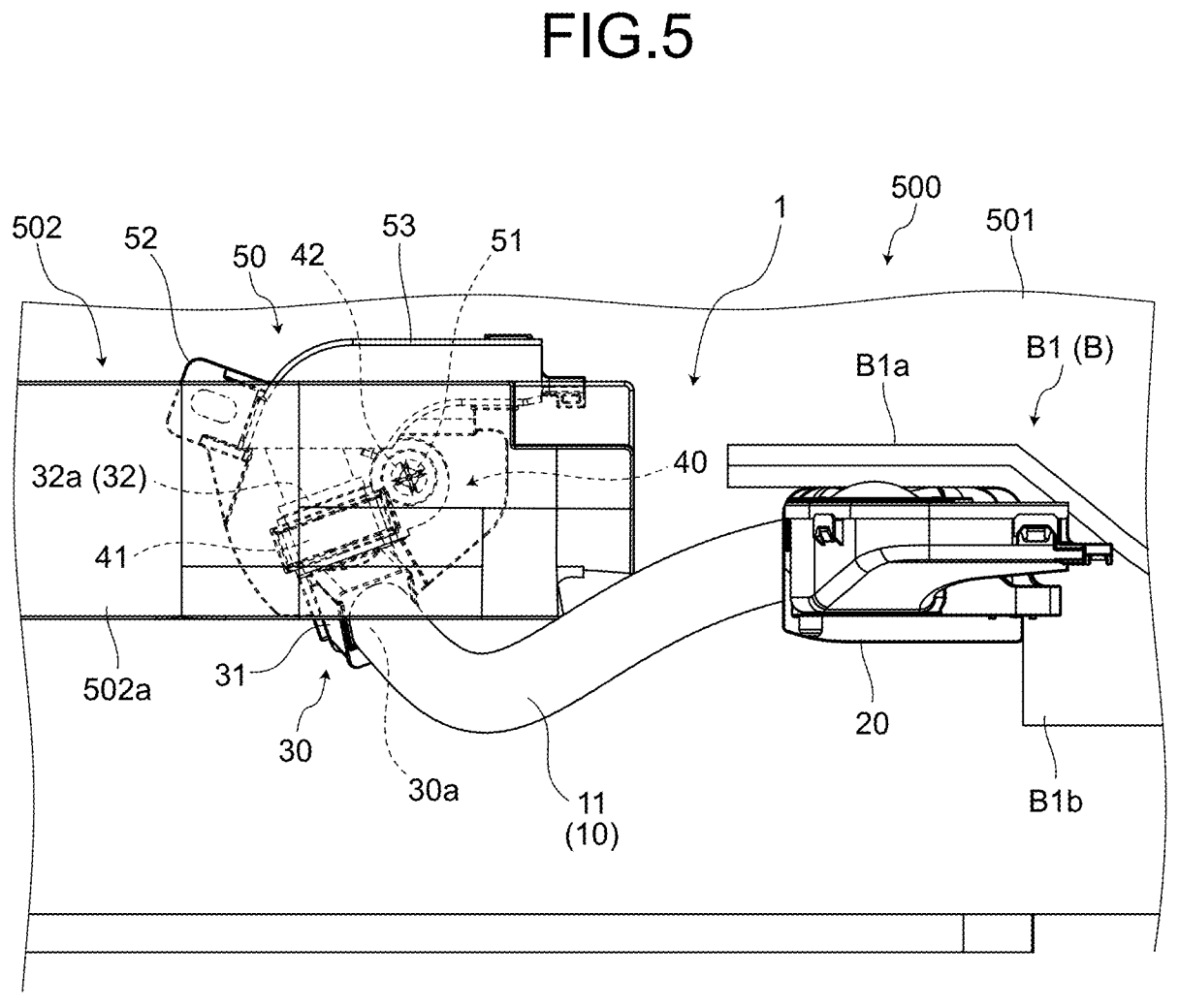
Figure 6:
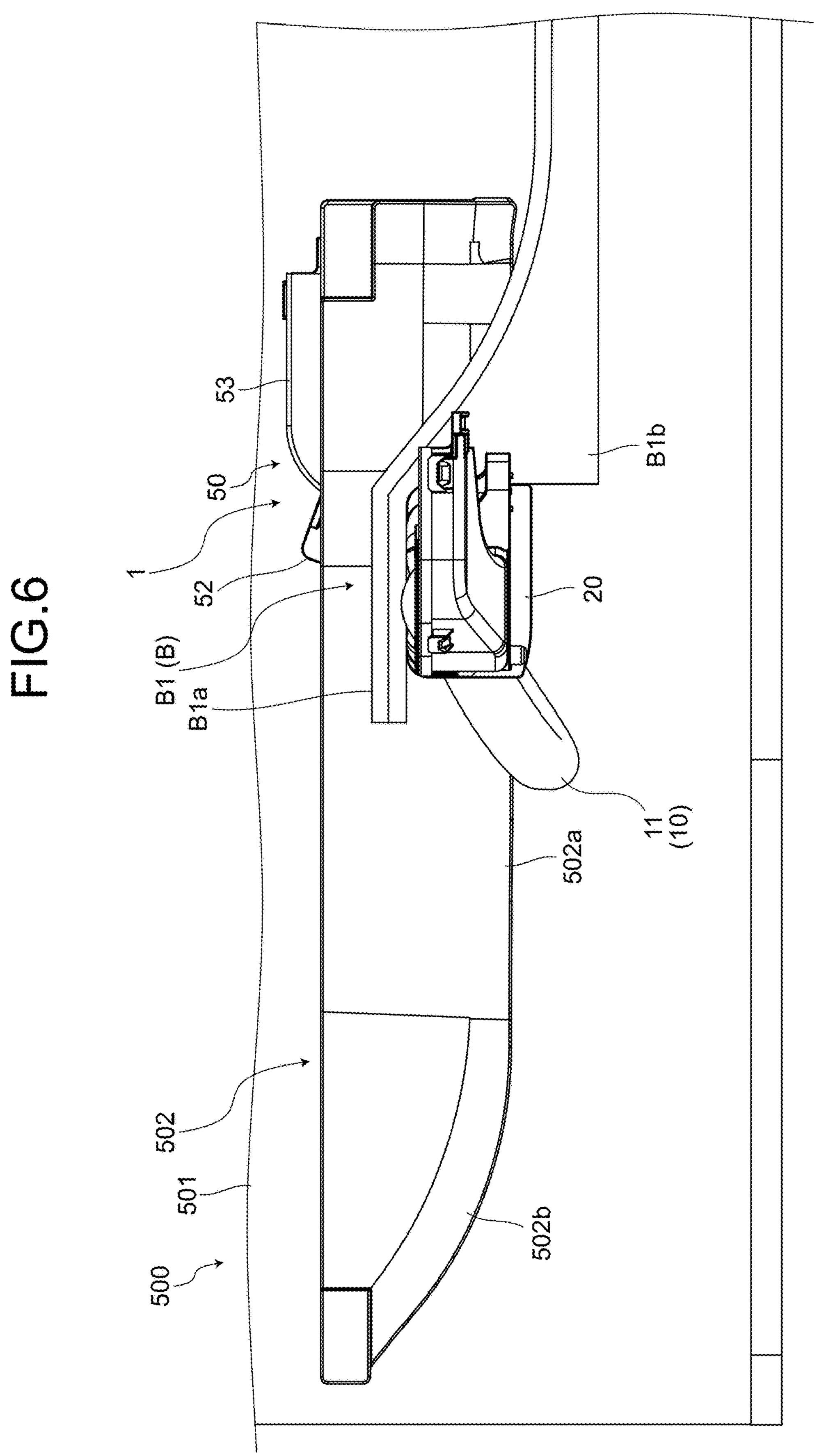
FIG. 6 is a plan view of the power supply device for a sliding door according to the embodiment from the vehicle interior, and illustrates when the sliding door is located at a half-opened position.

In the power supply device 1 for a sliding door, when the sliding door 500 at the half-opened position moves to the fully opened position, the door-side protector 30 and the door-side end portion of the straddling portion 11 are rotated forward about the first rotation axis R1 so that the opening 30*a* of the introduction portion 31 pointing in the opening operation direction of the sliding door 500 (toward the rear side of the vehicle) from the fully closed position to the half-opened position points toward the vehicle interior (FIGS. 4, 5, and 7). Further, in the power supply device 1 for a sliding door, when the sliding door 500 at the half-opened position moves to the fully opened position, the door-side protector 30, the door-side end portion of the straddling portion 11, and the rotation member 40 are rotated forward about the second rotation axis R2 so that the opening 30*a* of the introduction portion 31 pointing in the opening operation direction of the sliding door 500 (toward the rear side of the vehicle) from the fully closed position to the half-opened position points toward the lower side of the vehicle (FIGS. 4, 5, and 7). In other words, in the power supply device 1 for a sliding door, when the sliding door 500 at the half-opened position moves to the fully opened position, the door-side protector 30 and the door-side end portion of the straddling portion 11 are rotated forward about the first rotation axis R1, and the door-side protector 30, the door-side end portion of the straddling portion 11, and the rotation member 40 are rotated forward about the second rotation axis R2 so that the opening 30*a* of the introduction portion 31 pointing in the opening operation direction of the sliding door 500 (toward the rear side of the vehicle) from the fully closed position to the half-opened position points toward the vehicle interior side and the lower side of the vehicle.

A passing position of the straddling portion 11 on the lower side of the vehicle below the lower end 502*a* of the door trim 502 is displaced from the corner 502*b* in a closing operation direction of the sliding door 500 (toward the front side of the vehicle) depending on an opening operation of the sliding door 500 at the fully closed position. In other words, the sliding door 500 at the fully closed position is opened toward the fully opened position in a state in which the lower end 502*a* of the door trim 502 is provided along the straddling portion 11. Hence, in the power supply device 1 for a sliding door according to the present embodiment, when the sliding door 500 at the fully closed position is opened toward the fully opened position, the straddling portion 11 passes through the lower side of the vehicle below the lower end 502*a* of the door trim 502 and is drawn into the door trim 502. Accordingly, the power supply device 1 for a sliding door can minimize the exposure of the straddling portion 11 when the sliding door 500 at the fully closed position is opened to the fully opened position, thereby improving the appearance viewed from the vehicle interior.

On the other hand, since the straddling portion 11 illustrated herein is returns toward the upper side of the vehicle between the vehicle-body-side protector 20 and the door-side protector 30 when the sliding door 500 at the fully opened position (FIG. 5) moves to the half-opened position (FIG. 6) due to the routing path when the sliding door is fully closed, a large force toward the upper side of the vehicle is applied to the door-side protector 30 from the door-side end portion. Hence, in the power supply device 1 for a sliding door illustrated herein, when the sliding door 500 at the fully opened position moves to the half-opened position, a rotation angle of the door-side protector 30 about the first rotation axis R1 and a rotation angle of the door-side protector 30 about the second rotation axis R2 become larger than when the sliding door 500 at the half-opened position moves to the fully closed position. In addition, the straddling portion 11 illustrated herein has a small force applied to the door-side protector 30 from the door-side end portion until the sliding door 500 at the half-opened position reaches the fully closed position (FIGS. 1 and 2) due to a routing path when the sliding door is fully closed. Hence, in the power supply device 1 for a sliding door illustrated herein, when the sliding door 500 at the half-opened position moves to the fully closed position, a rotation angle of the door-side protector 30 about the first rotation axis R1 and a rotation angle of the door-side protector 30 about the second rotation axis R2 become smaller than when the sliding door 500 at the fully opened position moves to the half-opened position.

In the power supply device 1 for a sliding door, when the sliding door 500 at the fully opened position moves to the half-opened position, the door-side protector 30 and the door-side end portion of the straddling portion 11 are rotated in reverse about the first rotation axis R1 so that the opening 30*a* of the introduction portion 31 pointing toward the vehicle interior at the fully opened position points in the opening operation direction of the sliding door 500 (toward the rear side of the vehicle) (FIGS. 4, 5, and 7). Further, in the power supply device 1 for a sliding door, when the sliding door 500 at the fully opened position moves to the half-opened position, the door-side protector 30, the door-side end portion of the straddling portion 11, and the rotation member 40 are rotated in reverse about the second rotation axis R2 so that the opening 30*a* of the introduction portion 31 pointing toward the lower side of the vehicle at the fully opened position points in the opening operation direction of the sliding door 500 (toward the rear side of the vehicle) (FIGS. 4, 5, and 7). In other words, in the power supply device 1 for a sliding door, the door-side protector 30 and the door-side end portion of the straddling portion 11 are rotated in reverse about the first rotation axis R1, and the door-side protector 30, the door-side end portion of the straddling portion 11, and the rotation member 40 are rotated in reverse about the second rotation axis R2 so that the opening 30*a* of the introduction portion 31 pointing toward the vehicle interior and the lower side of the vehicle at the fully opened position points in the opening operation direction of the sliding door 500 (toward the rear side of the vehicle).

A passing position of the straddling portion 11 on the lower side of the vehicle below the lower end 502*a* of the door trim 502 is displaced toward the corner 502*b* positioned in the opening operation direction of the sliding door 500 (toward the rear side of the vehicle) depending on a closing operation of the sliding door 500 at the fully opened position. In other words, the sliding door 500 at the fully opened position is closed toward the fully closed position in a state in which the lower end 502*a* of the door trim 502 is provided along the straddling portion 11. Hence, in the power supply device 1 for a sliding door according to the present embodiment, when the sliding door 500 at the fully opened position is closed toward the fully closed position, the straddling portion 11 passes through the lower side of the vehicle below the lower end 502*a* of the door trim 502 and is drawn into the door trim 502. Accordingly, the power supply device 1 for a sliding door can minimize the exposure of the straddling portion 11 when the sliding door 500 at the fully opened position is closed to the fully closed position, thereby improving the appearance viewed from the vehicle interior.

As described above, in the power supply device 1 for a sliding door according to the present embodiment, the movement of the straddling portion 11 when the sliding door 500 is opened and closed is caused to follow the movement of the biaxial rotation mechanism (the door-side protector 30, the rotation member 40, and the fixed member 50) by the first rotation axis R1 and the second rotation axis R2. Accordingly, the power supply device 1 for a sliding door according to the present embodiment can minimize the exposure of the straddling portion 11 when the sliding door 500 is opened and closed, thereby improving the appearance viewed from the vehicle interior. Since the power supply device 1 for a sliding door according to the present embodiment has the biaxial rotation mechanism having an operation range narrower than an operation range of a uniaxial rotation mechanism in the related art, a space occupied by the biaxial rotation mechanism inside the door trim 502 can be reduced as compared with the one in the related art, and the mountability of a door installation component (an electrical component such as a speaker, a drink holder, or the like) can be improved.

In the power supply device for a sliding door according to the present embodiment, the movement of the straddling portion when the sliding door is opened and closed is caused to follow the movement of a biaxial rotation mechanism (the door-side protector, the rotation member, and the fixed member) by the first rotation axis and the second rotation axis. Accordingly, the power supply device for a sliding door according to the present embodiment can minimize exposure of the straddling portion when the sliding door is opened and closed, thereby improving the appearance viewed from a vehicle interior. Since the power supply device for a sliding door according to the present embodiment has the biaxial rotation mechanism having an operation range narrower than an operation range of a uniaxial rotation mechanism in the related art, a space occupied by the biaxial rotation mechanism inside the door trim can be reduced as compared with the one in the related art, and the mountability of a door installation component (an electrical component such as a speaker, a drink holder, or the like) can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device for a sliding door, comprising:

a wire harness that has a straddling portion that straddles a vehicle body and a sliding door and draws the straddling portion into a door trim through a lower side of a vehicle below a lower end of the door trim;

a vehicle-body-side protector that is fixed to the vehicle body and allows a vehicle-body-side end portion of the straddling portion to be inserted inside and the straddling portion to be drawn out toward the sliding door;

a door-side protector that is a member configured to perform routing of the straddling portion drawn into the door trim toward an introduction portion positioned in a closing operation direction of the sliding door when the sliding door is fully closed, and that draws, out of a cylindrical portion toward an upper side of the vehicle, a door-side end portion of the straddling portion drawn into the introduction portion;

a rotation member that has a bearing in which a cylinder axis of the cylindrical portion is set as an axis line of a first rotation axis and which rotates the door-side protector about the axis of the cylindrical portion by a force received by the door-side protector from the door-side end portion of the straddling portion depending on opening and closing of the sliding door, and a rotation shaft in which a vehicle width direction is set as an axis line of a second rotation axis; and a fixed member that is fixed to an inner panel of the sliding door and has a bearing which rotates the rotation member about the rotation shaft by a force received by the rotation member from the door-side end portion of the straddling portion via the door-side protector.

2. The power supply device for a sliding door according to claim 1, wherein, when the sliding door is fully closed, the straddling portion is drawn into the door trim through the lower side of the vehicle below a corner positioned in an opening operation direction of the sliding door at the lower end of the door trim.

3. The power supply device for a sliding door according to claim 1, wherein, when the sliding door is fully closed, the straddling portion is drawn into the door trim through the lower side of the vehicle below a corner positioned in an opening operation direction of the sliding door at the lower end of the door trim, and a passing position of the straddling portion on the lower side of the vehicle below the lower end of the door trim is displaced from the corner in the closing operation direction depending on an opening operation of the sliding door at a fully closed position.

4. The power supply device for a sliding door according to claim 1, wherein the vehicle-body-side protector is installed on the lower side of the vehicle below an upper wall of a side sill of the vehicle body, and the straddling portion drawn out of the vehicle-body-side protector is drawn toward the sliding door via a side wall of the side sill.

5. The power supply device for a sliding door according to claim 2, wherein the vehicle-body-side protector is installed on the lower side of the vehicle below an upper wall of a side sill of the vehicle body, and the straddling portion drawn out of the vehicle-body-side protector is drawn toward the sliding door via a side wall of the side sill.

6. The power supply device for a sliding door according to claim 3, wherein the vehicle-body-side protector is installed on the lower side of the vehicle below an upper wall of a side sill of the vehicle body, and the straddling portion drawn out of the vehicle-body-side protector is drawn toward the sliding door via a side wall of the side sill.

* * * * *